United States Patent [19]

Byron et al.

[11] Patent Number: 5,233,336

[45] Date of Patent: Aug. 3, 1993

[54] CONNECTED-RUN DROPOUT-FREE CENTER POINT FILL METHOD FOR DISPLAYING CHARACTERS

[75] Inventors: Michael Byron, Mountain View; Thomas Malloy, Portola Valley, both of Calif.

[73] Assignee: Adobe Systems Incorporated, Mountain View, Calif.

[21] Appl. No.: 539,222

[22] Filed: Jun. 15, 1990

[51] Int. Cl.⁵ .............................................. G09G 1/14
[52] U.S. Cl. ................................... 340/748; 340/730
[58] Field of Search ............... 340/730, 731, 728, 748

[56] References Cited

U.S. PATENT DOCUMENTS

| | | | |
|---|---|---|---|
| 4,544,922 | 10/1985 | Watanabe et al. | 340/728 |
| 4,675,830 | 6/1987 | Hawkins | 340/731 |
| 4,785,391 | 11/1988 | Apley et al. | 340/730 |

Primary Examiner—Ulysses Weldon
Attorney, Agent, or Firm—Roger S. Borovoy; David J. Larwood

[57] ABSTRACT

An improved method of displaying a character on a raster device using a modified center point fill method is described, beginning by defining the character by an outline of a series of edges in a path, scaling the character to a pixel grid of columns and scan lines in display space, identifying as a cross each point where an edge of the character intersects a horizontal midline of a scan line and storing a list of the crosses pairwise along each scan line as cross pairs. For each one of the cross pairs, all pixels having centers that are located between the crosses of the cross pair are selected and the range of the selected pixels is stored as a run for the cross pair. For each cross pair between two adjacent pixel centers, the pixel containing the horizontal midpoint of the cross pair is stored as a run for the cross pair. Adjacent cross pairs are identified and the run for each cross pair is tested against the run displaying each adjacent cross pair to see if the runs are properly connected. If they are not then at least one pixel is selected and an existing run is extended to include the selected pixel, if possible. Otherwise, a pseudocross pair is created as needed to properly connect the runs. Narrow horizontal features are also identified and connected to the character using similar methods.

11 Claims, 5 Drawing Sheets

CONNECTED-RUN DROPOUT-FREE CENTER POINT FILL METHOD FOR DISPLAYING CHARACTERS

FIELD OF THE INVENTION

In modern computer systems, it is often desireable to print or display characters in various sizes on paper, film or a computer screen. When the size of the character is large relative to the resolution of the display or print device, it is relatively easy to choose which picture elements or pixels should be printed or displayed in order to make a readable character. However, when the size of the character is small in relation to the resolution of the display, it is much more difficult to choose which pixels to display in order to make the character as distinct and recognizable as possible. The current invention relates to an improved method of legibly displaying characters at low resolution.

BACKGROUND OF THE INVENTION

Traditionally, characters have been printed using metal type which allows very detailed rendering of a character, including subtle curves and very fine lines. A character may be alphanumeric, an Oriental or other foreign language character, or even a fanciful design and may be printed in a variety of sizes. In modern computer devices, characters are defined on raster devices such as video display terminals or laser printers or by using a multi-pin print head. Characters can be printed on a surface or displayed on a video screen as a series of dots which are printed or turned on in order to approximate as closely as possible the ideal shape of the character. When characters are small enough relative to the resolution of the display device, choosing which pixels should be displayed to accurately represent the character becomes more complex than when the character is large. A typical video monitor can display about 72 pixels per inch. At this resolution it is difficult to display legibly most type faces smaller than about twenty pixels tall.

An ideal representation of the character is usually defined in "character space" at very high resolution as one or more areas bounded by an outline or path. A character consists of one or more continuous black areas. For instance the letter "O" consists of a single closed loop, the letter "d" consists of a loop connected to a line and the letter "i" consists essentially of a dot a short distance away from a line which may have additional details such as serifs. One way of describing a character involves defining an outline of the outer edge of each contiguous black portion of the character and then filling that outline to display the character. Since characters are usually printed in dark ink on a light background, one can describe filled areas as black but one skilled in the art will recognize that the method of this invention can be used to determine what pixels are candidates for display using any of many fill methods, including characters which are light on a dark background, commonly used in video displays, or characters on backgrounds having a different color. The outline is preferably defined as one or more paths, each of which may be traced either clockwise or counter-clockwise. Each path can be represented as a sequential series of curves and/or linear line segments called edges. If a black area has interior white spaces as, for instance, in the letter "O", each interior white area can also be defined by a path consisting of a series of edges.

When a character is displayed on a raster device, those pixels which fall within the black area of the character should be displayed, that is, they should be printed on a surface or turned on for a video display. At high resolution or when the character is very large, multiple pixels may fall within each black area and the character can be displayed in great detail. When the character is reduced to a small size, however, or the resolution of the device is limited, certain black areas may no longer cover multiple pixels and in fact may cover only a fraction of a pixel. Displaying small characters on a device of limited resolution has been a persistent problem in the past. This is illustrated in FIGS. 1-4 by a character on an 8×10 matrix. In FIG. 1 the outline of the character "S" is illustrated as filled at very high resolution. The raster display, however, can only turn on or off entire pixels.

One prior approach to this problem is the center point fill method, illustrated in FIG. 2. A pixel is displayed only if the center of that pixel falls within or on the boundaries of a black area, illustrated by pixels 40-44. Where only a limited number of pixels are available to display the character, there are gaps or dropouts 50-51 in the black areas so that it may be difficult to recognize the character. An alternative way of displaying the character, called area fill, is to turn on all pixels which intersect or fall within the outline of the character. The result, shown in FIG. 3, is that too many pixels are turned on, leading to blobs which also make the character difficult to recognize. At higher resolution both of these methods work successfully but at low resolution characters become difficult to recognize.

One method of resolving these problems is described in U.S. patent application Ser. No. 07-388,336, assigned to the same assignee as the subject invention. That application describes how to turn on pixels with centers that fall within a character black section (center point fill), then to selectively turn on additional pixels to connect each black section if needed (horizontal proximity fill and other methods). The present invention provides a faster method for connecting black sections of a character.

SUMMARY OF THE INVENTION

Characters are displayed with improved efficiency and legibility at relatively low resolution by modifying the center point fill method and selecting additional pixels as needed to maintain connectivity and avoid dropout problems. Selected pixels are then displayed according to the desired fill method (usually all are displayed). Pixels having centers within the interior portion of the character are selected (center point fill). One could also practice the present invention using reference points or regions within the pixel other than the center but for convenience only centers will be discussed. Additional pixels are selected as determined by applying a horizontal proximity fill test where a black section of the character crosses the line between two adjacent horizontal centers. Such lines will be referred to as midlines. If the intersection of a black section of a character with a midline is entirely within one pixel then that pixel is selected. If a black section of a character crosses between two adjacent pixel centers in parts of both pixels and if neither pixel is already selected, the pixel having more of the black section, measured along the line between pixel centers, is selected.

The center point fill and horizontal proximity fill tests do not always correctly display certain character features. One type of dropout may occur where there is a narrow character section at a shallow angle relative to the horizontal and no pixel centers happen to fall within that portion of the outline. The method of this invention can be used to detect and correct this type of dropout. Another type of dropout may occur where there is a narrow, horizontal excursion of the character, that is, a narrow extension in the horizontal direction that does not happen to intersect any horizontal midlines.

A character is analyzed for display in multiple passes, evaluating the character scan line by scan line (row by row) as a series of pixels which could be selected for display. A row of one or more horizontally adjacent, selected pixels is called a run. Each continuous portion of the character should be displayable by connected runs which are adjacent to each other relative to the path or the outline of the character. Runs may connect to adjacent runs on a higher or lower horizontal scan line and either overlap the preceding run or at a minimum touch diagonally from scan line to scan line. Each run is tested to determine whether it is properly connected to each adjacent run and where dropouts are detected, existing runs are modified or new runs added in order to select additional pixels and correct dropouts. X extremes are identified and tested for proper connection using a closely analogous method.

One object of this invention is to improve the legibility of characters displayed at low resolution by selecting those pixels in which the center falls in or on the edge of a black area and also by selecting enough additional pixels to make the character recognizable.

Another object of this invention is to eliminate dropouts caused by a thin character stem going through a pixel scan line or column without including a pixel center.

Another object of this invention is to properly display a pointed character feature. This is important for cases like the base of a "V" where the bottom pixel must be turned on or the character will appear to float off the baseline.

Yet another object of this invention is to properly display parts of a character including narrow horizontal excursions that do not include pixel centers.

Yet another object of this invention is to provide a faster method of correctly displaying a character.

DETAILED DESCRIPTION OF THE INVENTION

A character can be represented by a series of filled areas which contrast with the background. For convenience, the filled areas will be referred to as black areas, as in ink printed on a page, but the area can be filled by many methods well known to those skilled in the art. Also for convenience, pixels in black areas and runs of pixels are described as "displayed" but the method actually selects pixels for subsequent display using a desired fill method. A complete black fill is presumed, where all selected pixels are displayed.

The outline of each black area can be defined by a closed path consisting of sequential series of curves or linear line segments called edges. The interior of a character can be distinguished from the background by drawing a line from a point in any direction past the greatest extent of the character and counting the number of intersections with the path. If the number of intersections is odd, the point is inside the character and if the number is even the point is outside. As described above, characters which have enclosed white spaces such as the character "O" will have at least one additional path consisting of a series of edges to define each enclosed space. A character may contain more than one black area such as the letter "i" or many oriental characters. Once a path or series of paths is defined for a character, that path can, for example, be stored in computer memory and can be used for displaying characters of arbitrary size.

Figure 2:
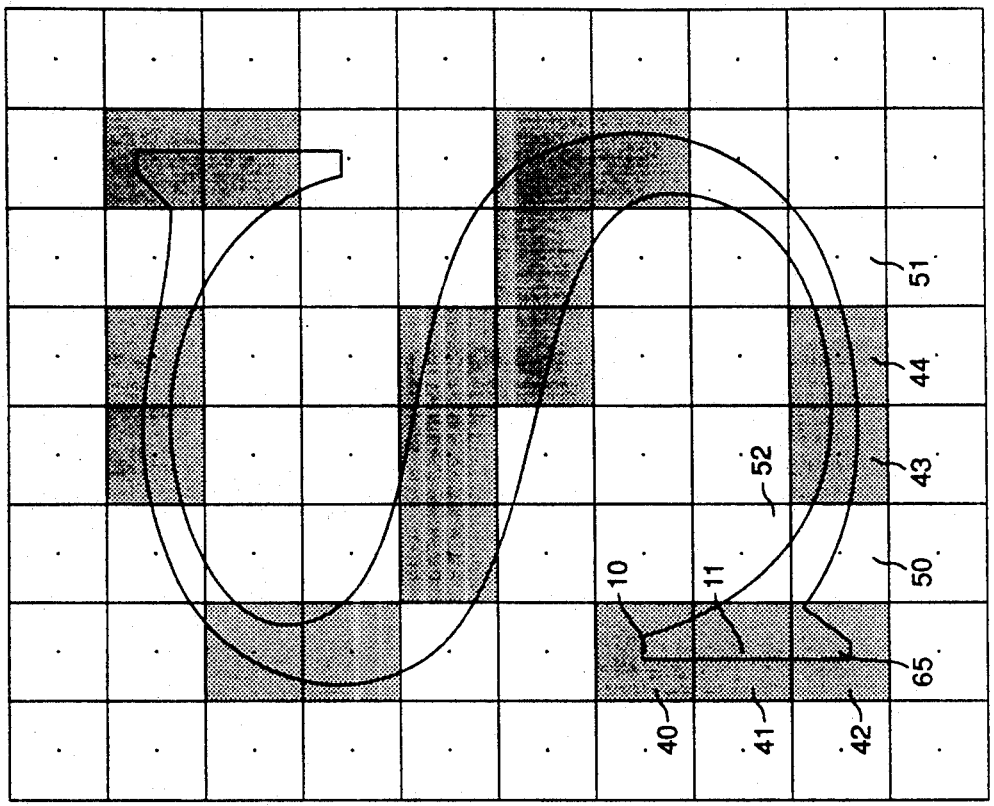
FIG. 2 illustrates the same character outline displayed by low resolution pixels using the center point fill method of the prior art.
Figure 1:
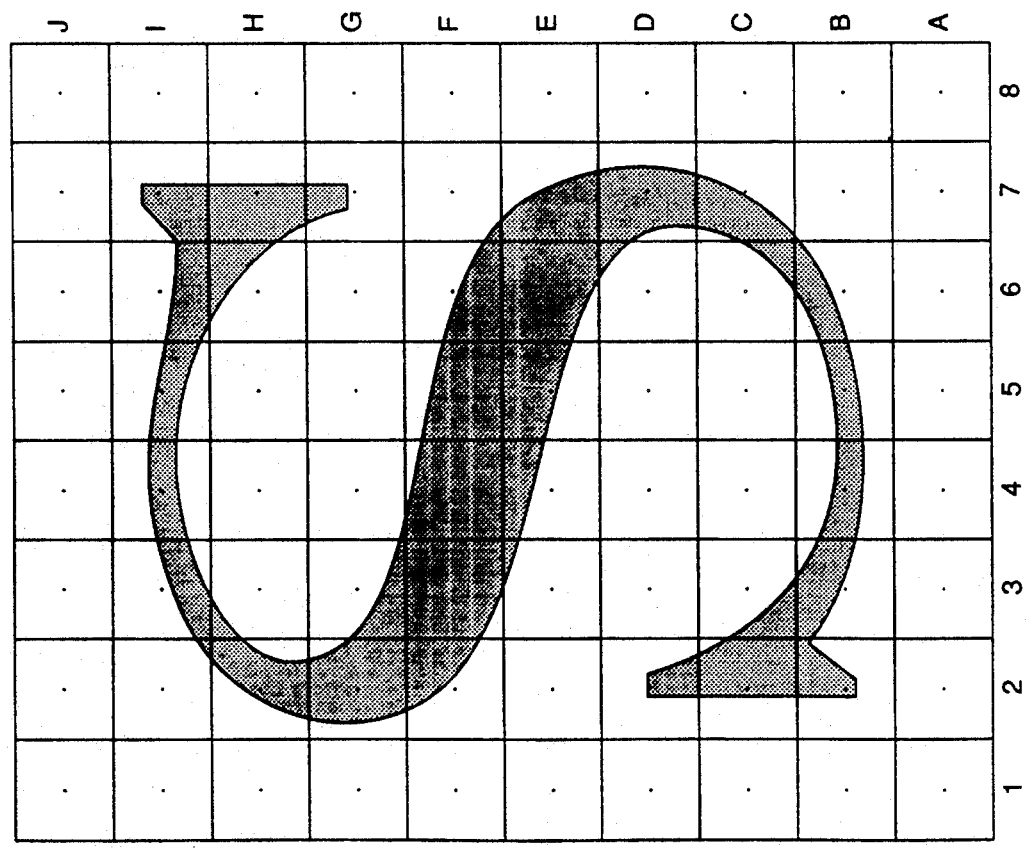
FIG. 1 illustrates the superimposition of the outline of a character displayed at very high resolution on a low resolution pixel matrix.

To display a character in a defined pixel area, often referred to as display space, the outline of the character must first be scaled and placed within a pixel grid by methods well known to those skilled in the art. Referring to FIG. 2, following well-known methods generally known as "center-point fill", pixels 40, 41, 42 having centers 10, 11 and 65 respectively which fall on or within the outline of the character, are displayed. When the resolution of the display device is low enough relative to character size, certain portions of the character will not include pixel centers and therefore will "drop out," that is, they will no longer be displayed, so the legibility of the character will decrease. In FIG. 2, for example, certain areas 40-44 of the character "S" are properly displayed but pixels such as 50, 51 and 52 contain areas of the character which do not happen to include a pixel center and thus are not displayed, making the character less legible. Some dropouts can be detected by identifying black portions of a character that cross a horizontal midline but do not include a pixel center and displaying the pixel closest to an edge along that horizontal midline. Methods of performing a horizontal proximity fill test are described in U.S. patent application Ser. No. 07-388,336, assigned to the same assignee as the subject application.

Figure 4:
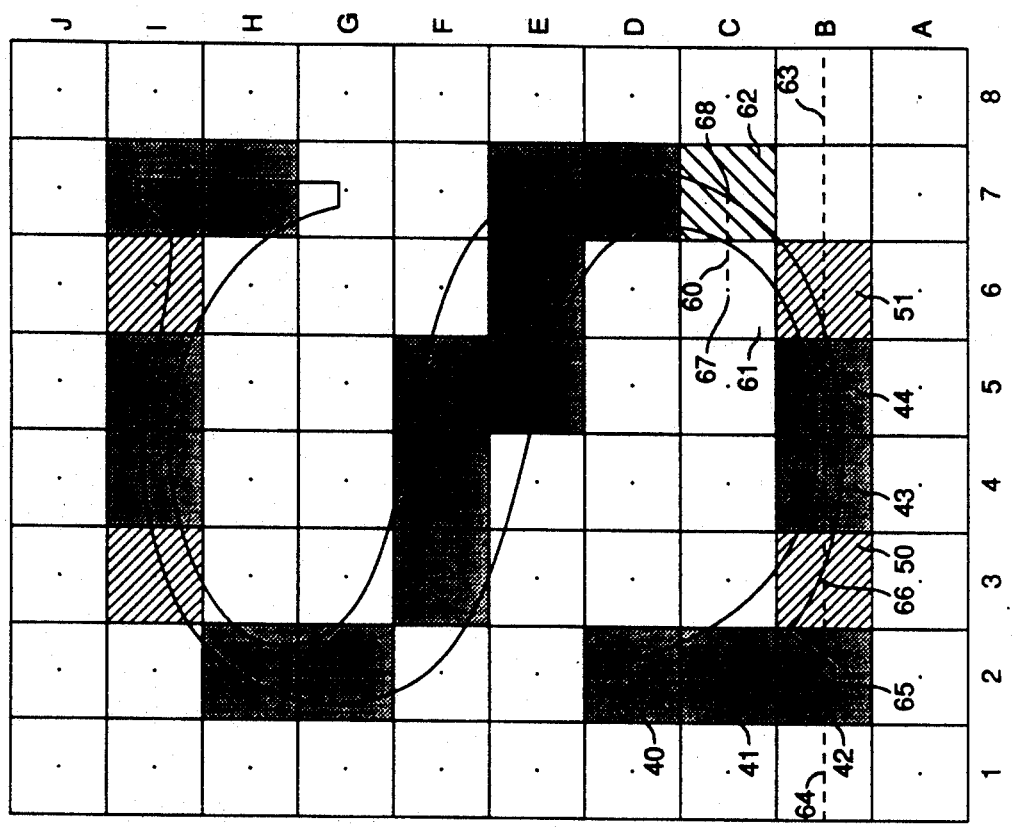
FIG. 4 illustrates the same character outline on the same pixel matrix displayed using the method of the present invention. The gray squares represent pixels filled according to the center fill method and upward-sloping hash marks represent pixels filled according to the horizontal proximity method.
Figure 3:
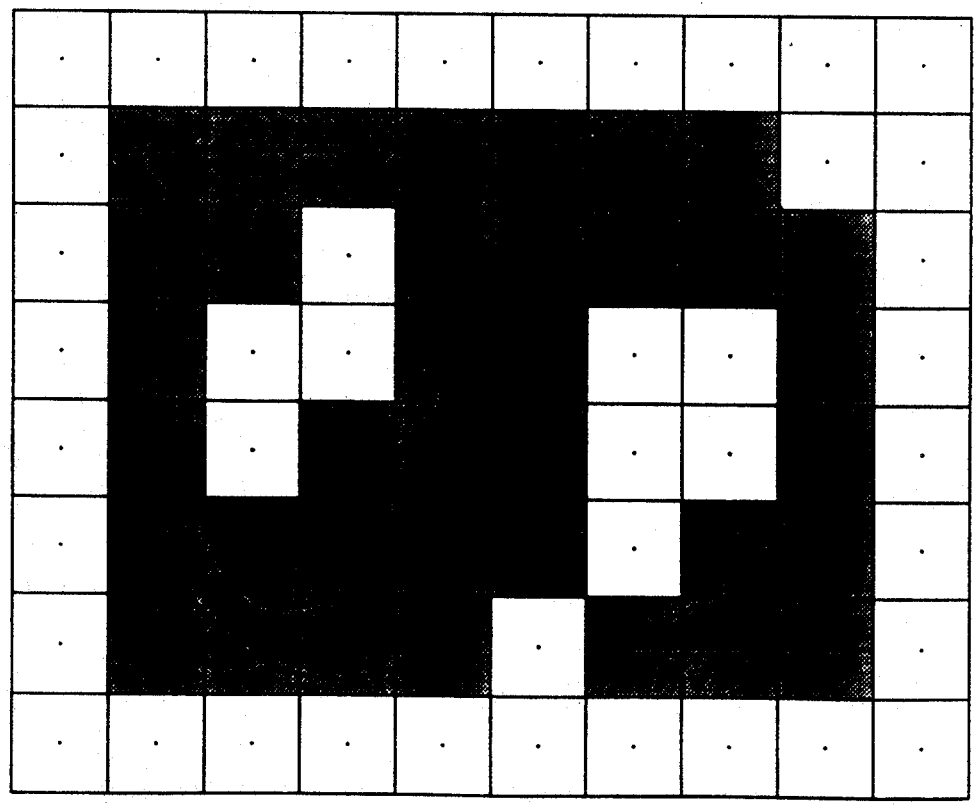
FIG. 3 illustrates the same character on the same pixel matrix displayed using the area fill method of the prior art.

Referring to FIG. 4, the present invention can be practiced as follows. Using techniques well known to persons skilled in the art, the character is first scaled to fit a pixel grid for the desired display space and curves are flattened to a series of connected, linear edges in order along a path. [See, for example, Steven Harrington, "Curves and Fractals," Chapter 11 in *Computer Graphics, A Programminc Approach*, 2d Ed., McGraw-Hill, 1987] Each path is traced in one direction (clockwise or counter-clockwise) and crosses are identified as points where edges cross a horizontal midline, such as 63 through pixel centers 64, 65 and 66. If an end point of an edge happens to lie directly on a horizontal midline, the end point is moved up or down slightly so that no edge end points are crosses. The crosses are stored in a path list, in path order. Edge end points which are X extremes are also identified. In the preferred implementation, edge endpoints which are Y extremes are also identified and the crosses and X and Y extremes are included in the same path list. One skilled in the art may choose to include additional end points in the path list to represent the path more accurately.

The order of crosses on each scan line is determined and stored as a list in scan line order. The crosses on each line are paired, forming "cross pairs," to easily identify where a black section of the character crosses a horizontal midline. In FIG. 4, for example, scan line B includes a cross pair in pixel B2 and a second cross pair with crosses in pixels B3 and B6. The goal of the method of this invention is to determine a run of one or more horizontally adjacent pixels for each cross pair and then to modify runs or add runs if needed in order to display the character as a series of connected runs.

To display pixels by the center point fill method, each cross pair is tested and where a center point of a pixel such as pixels B2, B4 or B5 falls within a cross pair or intersects a cross, that pixel is turned on. This results in most cross pairs being displayed as runs. Runs can be described for convenience by the starting and ending pixel, e.g., B2-B2 or B4-B5. In the preferred implementation, for each cross pair displayed as a run, the location of the leftmost displayed pixel in the corresponding run is stored with the leftmost cross as a pixel number in the scan line and the pixel number of the rightmost displayed pixel is stored with the rightmost cross. For example, the pixel number for each cross of the cross pair in pixel B2 is 2; the pixel number for the cross in pixel B3 is 4; and the pixel number for the cross in pixel B6 is 5.

Figure 5A:
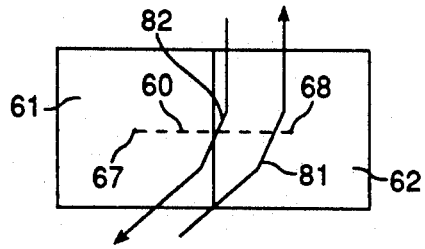
FIGS. 5A and 5B illustrate details of displaying thin, vertical character segments.
Figure 5B:
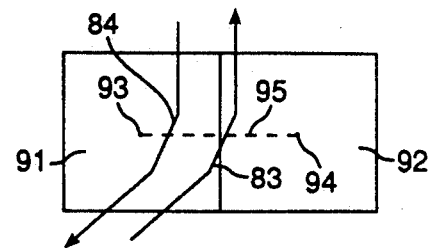

The center-fill method will not catch certain dropouts where a black section of the character intersects a horizontal midline without intersecting a pixel center. Referring to FIG. 5A, where a cross pair is located between two adjacent pixel centers such as 67 and 68, the following horizontal-proximity fill method is used. FIGS. 5A and 5B illustrate examples of crosses in pixels 61, 62 and 91, 92. If both of the crosses of the cross pair were in the same pixel (the black section intersected a midline entirely within one pixel), such as pixel 62 in FIG. 5A, that pixel is turned on. If the black section crosses a midline, e.g. 95 in FIG. 5B, in parts of two adjacent pixels, e.g. 91 and 92, the pixel which contains the greatest length of black section along the midline is turned on. One simple way to select that pixel is to determine the pixel whose center is closer to a cross, e.g. pixel 91 in FIG. 5B, and to turn on that pixel. The preferred implementation determines the midpoint between a cross pair and displays that cross pair as a one pixel run consisting of the pixel containing that midpoint. After performing center point fill and horizontal proximity fill, each cross pair is displayed by a run of at least one pixel.

If the black section crosses the midline equidistant from both pixel centers, one pixel is turned on according to an arbitration test. One method of resolving the arbitration is to always turn on the first of the two pixels along the scan line. Another method of resolving the arbitration is to alternatively turn on the first and then the second pixel each time an arbitration is required. Other arbitration schemes are well known to those skilled in the art.

The horizontal proximity fill method will not catch certain dropouts where a black section of the character intersects a vertical midline without intersecting a pixel center. U.S. patent application Ser. No. 07-388,336 describes methods including using a variation of the horizontal proximity fill test to correct such dropouts. The method of this invention provides an alternative, faster method of detecting and correcting such dropouts.

Testing for Dropouts

Figure 6:
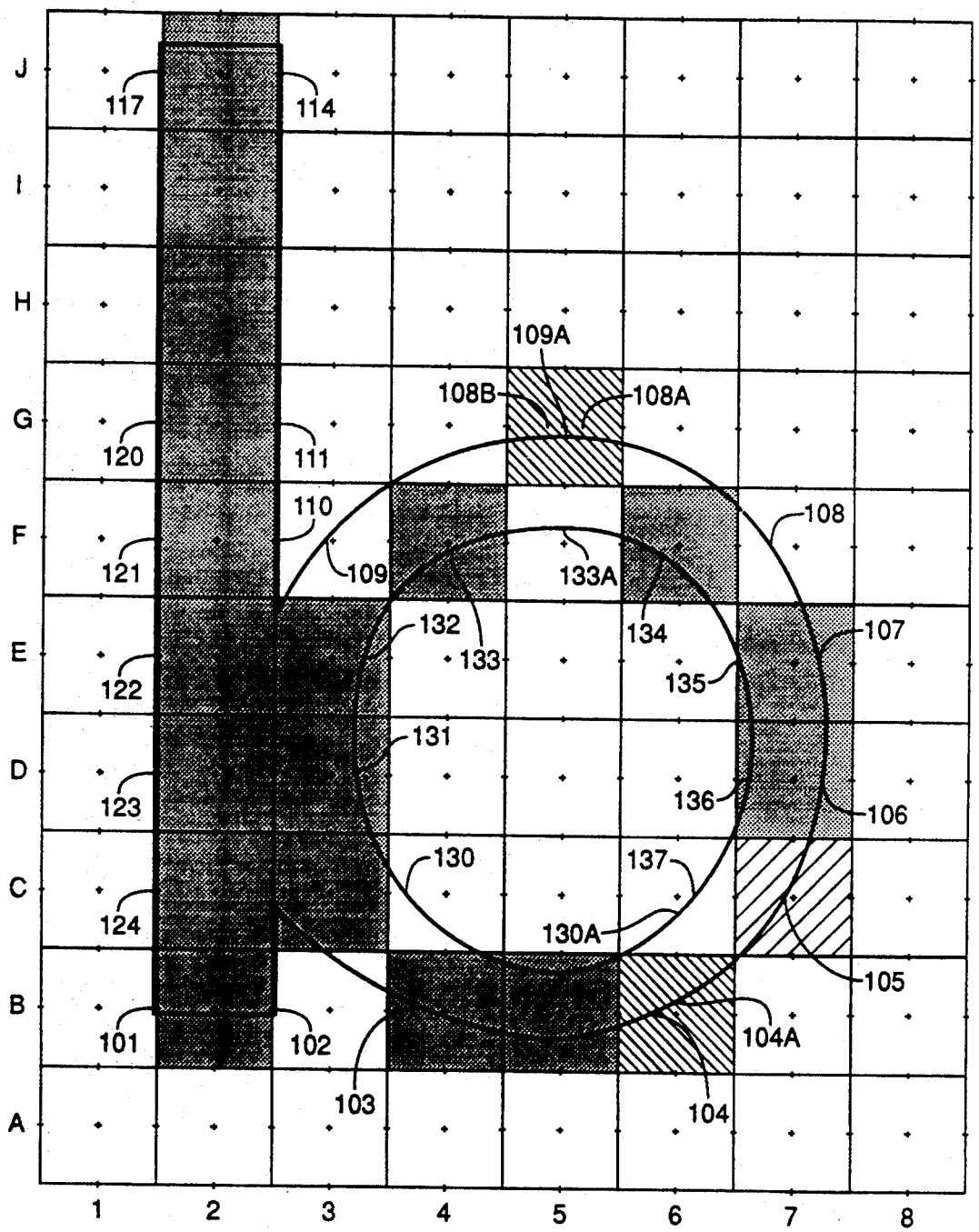
FIG. 6 illustrates a lower case "b" character on a pixel grid to show details of detecting and fixing dropouts. Downward sloping, narrow hash marks represent a pixel filled according to the connected run method.

After center point fill and horizontal proximity fill, each cross pair is associated with a run of one or more displayed pixels along a scan line. To detect dropouts, each cross pair is compared to each adjacent cross pair and the runs associated with adjacent cross pairs are tested to see if they are properly connected, that is, making pixel-to-pixel contact along a pixel edge or at a pixel corner. Adjacent cross pairs are identified by tracing the path associated with each cross of the pair, identifying the preceding and subsequent cross along each path and finding the cross pair for each of those crosses. Runs associated with adjacent cross pairs are called adjacent runs. There are potentially four cross pairs adjacent to the cross pair being tested (the "current" cross pair), but in many configurations some of those pairs are redundant. Referring to FIG. 6, cross pair 101-102 has two adjacent cross pairs. Cross 101 is preceded in path order by cross 124, which is part of cross pair 124-130 and followed by cross 102, which is part of the current cross pair. Cross 102 is preceded by cross 101 and followed by cross 103, which is part of cross pair 103-104. Cross pair 122-132 has three adjacent cross pairs (121-110, 109-133 and 123-131) but cross pair 117-114 in pixel J2 has only one adjacent cross pair.

Cross pairs may be tested in many possible orders. In the preferred form of the invention the scan lines are examined in order and each cross pair is tested in the order it is encountered. One skilled in the art will recognize that looking in only one vertical direction and only one horizontal direction will avoid duplicate testing of the same two adjacent cross pairs. One skilled in the art will also recognize that cross pairs can be examined, for example, by following character features from one Y extreme to the next. Each cross pair is tested for proper connection against adjacent cross pairs that are up from or to the right of the cross pair being tested. For example, in FIG. 6 the first cross pair is 101-102 on scan line B, which is tested against the upper, adjacent cross pair 124-130 and against the right, adjacent cross pair 103-104.

The run displaying the current cross pair is tested to see if it is connected to runs displaying adjacent cross pairs. Two runs are connected if at least one pixel in one run shares an edge or corner with one pixel in the other run. In the preferred implementation, pixels are square but one skilled in the art will recognize how to test runs of pixels which are not square. One skilled in the art will also recognize how to use alternative tests to determine "proper connection" of runs and still come within the teachings of this invention.

Two adjacent runs on adjacent scan lines which are also separated by one or more non-displayed pixels are not properly connected and the dropout is repaired using the method described in the next section.

Two adjacent runs in the same scan line which are also separated by one or more non-displayed pixels may still be connected by a continuous portion of the character. In the preferred implementation, two such adjacent runs are considered connected if runs adjacent to those runs complete a connection between them. Referring, for example, to FIG. 6, adjacent runs B2—B2 and B4-B5 are not connected directly but both are connected to run C2-C3 (adjacent to B2—B2). Cross pairs displayed by adjacent runs on the same scan line necessarily are connected by at least one path which necessarily goes above or below the horizontal midline of that scan line. The direction of one such path, such as 102 to 103, is determined and further analysis is limited to the present scan line (containing the runs being tested) and the adjacent scan line (upper or lower) in the indicated direction.

The path from the leftmost cross of the leftmost cross pair, e.g, 101, is traced towards the adjacent scan line in the indicated direction and, if the next adjacent cross is in the indicated scan line, e.g. 124, the run (C2-C3) displaying the cross pair (124-130) containing that cross is tested for connection with both of the runs being tested. If there is no cross in that adjacent scan line adjacent to the leftmost cross or if there is but that third run does not connect both runs being tested, the path from the rightmost cross of the rightmost cross pair, e.g, 108 in comparing runs F2—F2 and F4—F4, is traced towards the adjacent scan line in the indicated direction and, if the next adjacent cross is in the indicated scan line, the run displaying the cross pair containing that cross is tested for connection with both of the runs being tested. If the new runs, individually or together, connect the runs being tested the runs are properly connected. Otherwise a dropout is noted and repaired using the method described in the next section.

One skilled in the art will recognize that other tests can be used to decide whether two adjacent runs on the same scan line that are not directly connected can be considered properly connected, for example, in the case where one or more runs in the adjacent scan line connect those runs. In FIG. 6, for example, if a cross pair on another path (not shown) was displayed by a run including pixel G5, runs F4—F4 and F6—F6 could be considered connected even though G5 was not part of a run adjacent to either of those runs. One implementation of this method is described below in example 1.

Fixing Dropouts

Once a dropout is identified it is fixed, preferably before identifying additional dropouts, by extending existing runs or creating new runs. One skilled in the art will recognize that it also is possible to store information about the location of dropouts and to fix them at a later time. To connect runs that are not properly connected, two scan lines are examined and the intersections, called vertical intersections, between any path and the vertical midline through the column including each dropped out pixel are identified. The intersections in each column are placed in order vertically, and one or more appropriate pixels containing vertical midpoints are displayed by extending existing runs or adding new runs, as needed.

Two adjacent scan lines must be selected and analyzed in order to fix dropouts. A dropout could occur between two runs in the same scan line or between two runs in adjacent scan lines. If the dropout occurs between runs on adjacent scan lines, the following test is performed using those two scan lines. If the dropout occurs between runs on the same scan line, any path that connects the runs necessarily goes above or below the horizontal midline of that scan line. By testing the path between the innermost crosses, that direction is determined and the scan line containing the cross pairs and the adjacent scan line in the direction indicated by the path are examined using the following test. For example, in FIG. 6, the path between cross pairs 109-133 and 134-108 goes up at each of crosses 109, 133, 134 and 108 so the current and upperscan lines, F and G, are selected as of interest and tested as described below.

Every path segment between crosses in the scan lines of interest is traced, noting any vertical intersections with the vertical midline through each column containing a dropped out pixel. The highest intersection along the lowest path and the lowest intersection along the highest path are taken as intersections of particular interest, the midpoint of those two intersections is found, and the pixel containing that midpoint is selected for display, applying an arbitration test if necessary, e.g. if the midpoint fell on a pixel boundary. One skilled in the art will recognize that other methods can be used to choose which pixel or pixels to display. For example, each vertical intersection in each empty column could be identified and ordered vertically from bottom to top (or vice versa) as intersection pairs, the midpoint of each pair determined and pixels containing a vertical midpoint selected for display, applying an arbitration test if needed.

To complete the connection of the cross pairs being examined, some adjustment of one or more runs is required, incorporating each pixel to be displayed with a previously existing run if possible. One skilled in the art will recognize that selection and modification of runs can be done using one or more of several methods: by looking at the proximity of each cross to the midline of each newly displayed pixel; by always selecting one, e.g. the leftmost, cross; arbitrarily; or by other suitable tests.

If pixels to be displayed can not be connected to existing runs, new crosses or pseudocrosses are defined and paired. The pseudocrosses should be on the horizontal midline through a pixel to be displayed and should not overlap an existing cross pair. In the preferred implementation, pseudocrosses are created on the horizontal midline of a pixel to be displayed, on alternate sides of the vertical midline of that pixel, less than half a pixel-unit from and preferably relatively close to the vertical midline. If this placement overlaps an existing cross pair, the position of the pseudocross pair is adjusted. The pseudocross pair is included in scan line order to display a run including the new pixel. A run of more than one pixel to be displayed can be marked with a single pseudocross pair. A complex figure, such as the one illustrated in FIG. 8, may require more than one pseudocross to fix and display dropouts. In one implementation, the new pseudocrosses are included in path order for the character but this is not necessary in order to properly display a dropout. The pseudocross pair can be tested for proper connection with adjacent cross pairs, but since each pseudocross pair is created in order to fix a connection between two runs, it is necessarily properly connected to the adjacent cross pairs.

One implementation of the method to fix dropouts is given below in Example 2. Illustrative variations are described in Examples 3 and 4. Using the method of this invention allowed for faster display of a character since vertical intersections only needed to be identified when dropouts are detected. Overall, this led to faster display of characters than is possible using prior art methods.

Extremes

Certain characters include narrow horizontal features which may not be easily displayed at low resolution by using only the fill methods described above. The scaled character, that is, scaled to the pixel grid of the desired display space, is examined to identify (horizontal) X extremes—points where delta X changes sign. Delta X is the change in X from point to point along the path and changes sign whenever X hits a local horizontal maximum or minimum and then begins to move in the opposite direction. An X extreme is also marked when delta X becomes 0 or when delta X ceases to be 0, which corresponds to the top and bottom points of a vertical feature. An X extreme does not have to include a dramatic feature, however. For example, the character in FIG. 6 includes a maximum X extreme roughly halfway between crosses 106 and 107, and other X extremes close to crosses 136, 131, 101 and 117. In the preferred implementation, X extremes are identified in the pass when crosses are identified, and the extremes are stored in a separate list in path order. In the preferred implementation, the extremes were included in the list of edge end points and crosses.

To properly display a character, the center point fill, horizontal proximity fill and connected run fill described above are first performed. In a subsequent pass, each extreme is tested for proper connection to a displayed run. The path through each extreme is traced forward and backward to identify the closest adjacent run, in path order. If the extreme is within one-half pixel distance of an adjacent run, no further processing is required and the extreme is ignored.

The remaining extremes are analyzed by tracing the path forward and backward from the extreme to the closest cross pair in each direction and identifying intersections with vertical midlines between the closest adjacent run and the extreme. As described for the connected run dropout fill described above, the vertical intersections in each column are ordered, midpoints are identified, and one or more pixels are displayed by extending existing runs, displaying creating pseudocross pairs and adding new runs. Example 5 describes one implementation of displaying X extremes.

EXAMPLE 1

The character in FIG. 6 was analyzed and found to include several possible configurations of cross pairs, including dropouts. Starting at the lower left, three cross pairs were properly connected. The run B2—B2 for cross pair 101-102 began and ended with pixel B2. Adjacent cross pair 124-130 (up from 101-102) was displayed by run C2-C3. The runs displaying 101-102 and 124-130 shared at least one common edge, for example between pixels B2 and C2, so the runs were properly connected. This could be determined, for example, by comparing the end pixel numbers for each run. The pixel number for B2 was not more than one greater than the pixel number for C3 and the pixel number for B2 was not more than one less than the number for C2. Starting again from 101 102, adjacent cross pair 103-104 (right from 101-102) was displayed by run B4-B5. Comparing B2 of cross pair 101-102 and B4 of cross pair 103-104, pixel B3 in column 3 was not displayed. The path between 102 and 103 went up (readily determined if the location of a Y extreme between the crosses was known), so run C2-C3 displaying cross pair 124-130, adjacent to cross pair 101-102 in the upward, adjacent scan line, was identified and found to bridge pixel B3 with pixel C3, connecting both runs being tested. Therefore, cross pairs 101-102 and 103-104 were properly connected.

The first instance of a dropout occurred between cross pairs 103-104 and 137-105. Cross pair 103-104 was adjacent to cross pairs 101-102 and 137-105 but in the preferred implementation, only the connection between 103-104 and 137-105 (both up and right in this instance) remained to be tested. Cross pair 137-105 is displayed by the one pixel run, C7—C7. Note that pixel C7 was selected to display cross pair 137-105 according to the horizontal proximity fill method. Pixel B5, the rightmost pixel of the run of current cross pair 103-104 was more than one column left of pixel C7, the rightmost pixel of 137-105 and the adjacent cross pairs were on adjacent scan lines, so a dropout had to be fixed. Using the method for fixing dropouts described in Example 2, the run of cross pair 103-104 was extended to include pixel B6 and 103-104 was then properly connected to 137-105.

The connected run test was applied to the cross pairs in scan rows C, D and E and each cross pair was found to be correctly connected. In scan line F, cross pair 121-110 was properly connected to adjacent runs 120-111 and 109-133 (non-displayed pixel F3 between F2 and F4 was bridged by displayed pixel E3 in the lower, adjacent scan line as part of the run displaying cross pair 122-132 which was adjacent to both cross pairs being tested).

Another type of dropout was found between cross pair 109-133 (displayed by run F4—F4) and cross pair 134-108 (displayed by run F6—F6). Pixels F4 and F6 were separated by a non-displayed pixel and not bridged by a displayed pixel in the upper, adjacent scan line (the path went up between the cross pairs). Using the method described below, pixel G5 was displayed to connect 109-133 to 134-108. The rest of the character was scanned and each subsequent cross pair was found to be properly connected to adjacent cross pairs.

EXAMPLE 2

Referring again to FIG. 6, cross pairs 103-104 and 137-105 were not properly connected before fixing the dropout in column 6, scan lines B-C. The cross pairs being tested were in adjacent scan lines B and C, so path segments between crosses in those scan lines were tested to repair the dropout. Tracing the path between 104 and 105, the path crossed the vertical midline of column 6 at vertical intersection 104A. Tracing the path between 130 and 137, the path crossed the vertical midline of column 6 at vertical intersection 130A. Tracing the path between 101 and 124, there were no intersections with the vertical midline of column 6. Similarly, tracing the path between 102 and 103, there were no intersections with the vertical midline of column 6.

Vertical intersections 104A and 130A were selected as of interest and the vertical midpoint between intersections 104A and 130A was calculated to occur within pixel B6, so that pixel was displayed by extending the run for cross pair 103-104 horizontally to include pixel B6. The run associated with cross pair 103-104 thereafter consisted of B4-B6 so cross pairs 103-104 and 137-105 were properly connected.

Cross pair 109-133 (displayed by run F4—F4) was not properly connected to adjacent cross pair 134-108 (displayed by run F6—F6). These cross pairs were on the same scan line and the path between them went up. Pixels F4 and F6 were separated by non-displayed pixel F5 and not bridged through even a common corner by a run including pixel G5. Each path between crosses in current scan line F or upper adjacent scan line G was traced to identify any intersections with the vertical midline in column 5 in those scan lines. Tracing the path between 109 and 108, the path crossed the vertical midline of column 5 at vertical intersection 109A. Tracing the path between 133 and 134, the path crossed the vertical midline of column 5 at vertical intersection 133A. Tracing the path between 121 and 120, there were no intersections with the vertical midline of column 5. Similarly, tracing the path between 111 and 110, there were no intersections with the vertical midline of column 5.

The two intersections were arranged in order from bottom to top (133A, than 109A), the midpoint between each intersection pair was calculated and pixel G5 containing that vertical midpoint was selected for display. Pixel G5 was not a horizontal extension of either of the now-connected runs so a new cross pair was needed. Pseudocrosses 108A and 108B were created on the horizontal midline of scan line G, positioned an arbitrarily short distance away from and on either side of the midline of column 5. The pseudocrosses were included in scan line order in scan line G with a corresponding run to display pixel G5.

EXAMPLE 3

Figure 7:
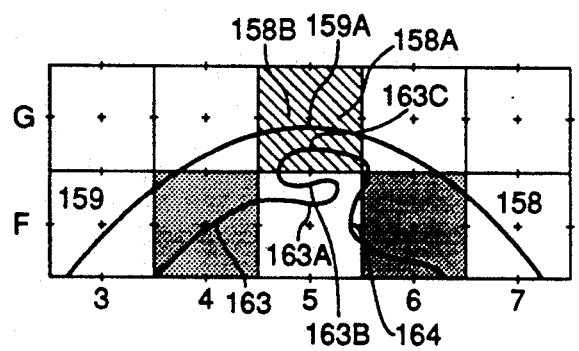
FIG. 7 illustrates details of identifying vertical intersections.

The importance of tracing each path when identifying vertical intersections is illustrated in FIG. 7, a fanciful variation on a portion of the character illustrated in FIG. 6. Comparing runs for cross pairs 159-163 and 164-158, since the path goes up and intervening pixels F5 and G5 are not displayed, the runs are not connected. Tracing the path between crosses 159 and 158, the path crosses the vertical midline of column 5 at vertical intersection 159A. Tracing the path between crosses 163 and 164, the path crosses the vertical midline of column 5 at vertical intersections 163A, 163B and 163C. Using the preferred implementation, highest intersection 163B of the lower path is compared to lowest intersection 159A of the upper path, the vertical midpoint is found, and pixel G5 is selected for display. Since neither of the runs being tested can be extended to display pixel G5, pseudocrosses 158A and 158B are created and included in scan line order in scan line G to display pixel G5.

Under an alternate implementation, intersections 163A-C and 159A are ordered pairwise from bottom to top as pairs 163A-163B and 163C-159A. The midpoint of each of these intersection pairs is determined and the pixel containing each midpoint is selected for display. By this test, pixels F5 and G5 are selected for display. Pixel F5 is horizontal extension of either run F4—F4 or F6—F6 and either run can be extended to include pixel F5. Choosing to always extend the leftmost run of newly connected and horizontally touching runs, run F4—F4 is extended. Pixel G5 is not a horizontal extension of either of the runs being tested, so pseudocrosses 158A and 158B are created and included in scan line order in scan line G to display pixel G5.

EXAMPLE 4

Figure 8:
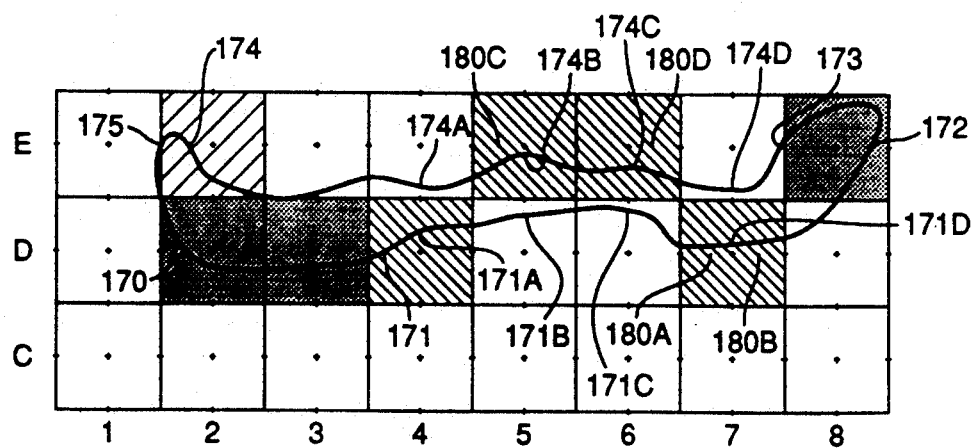
FIG. 8 illustrates details of adding pseudocrosses.

An example of how to extend runs or to create pseudocrosses to display new pixels is illustrated by the partial character in FIG. 8. After building runs, as illustrated, by the center point fill and horizontal proximity fill tests, run D2-D3 (displaying cross pair 170-171) is correctly connected to the run displaying adjacent cross pair 175-174 but (comparing pixels D3 and E8) is separated by non-displayed pixels in columns 4-7 from run E8—E8 (displaying adjacent cross pair 173-172). The runs being tested are in adjacent scan lines D and E, so paths are traced between crosses in those scan lines. Tracing the path between 171 and 172 identified vertical intersections 171A-171D. Tracing the path between 174 and 173 identified vertical intersections 174A-174D. After ordering the vertical intersections in each column (171A-174A, etc.) and finding midpoints, pixels D4, E5, E6 and D7 are selected for display. The run displaying cross pair 170-171 is extended to include pixel D4. Pseudocrosses 180C and 180D are created to display the run consisting of pixels E5-E6 and added between 175-174 and 173-172 in scan line order. Pseudocrosses 180A and 180B are created to display run D7-D7 and added after 170-171 in scan line order.

EXAMPLE 5

Figure 9:
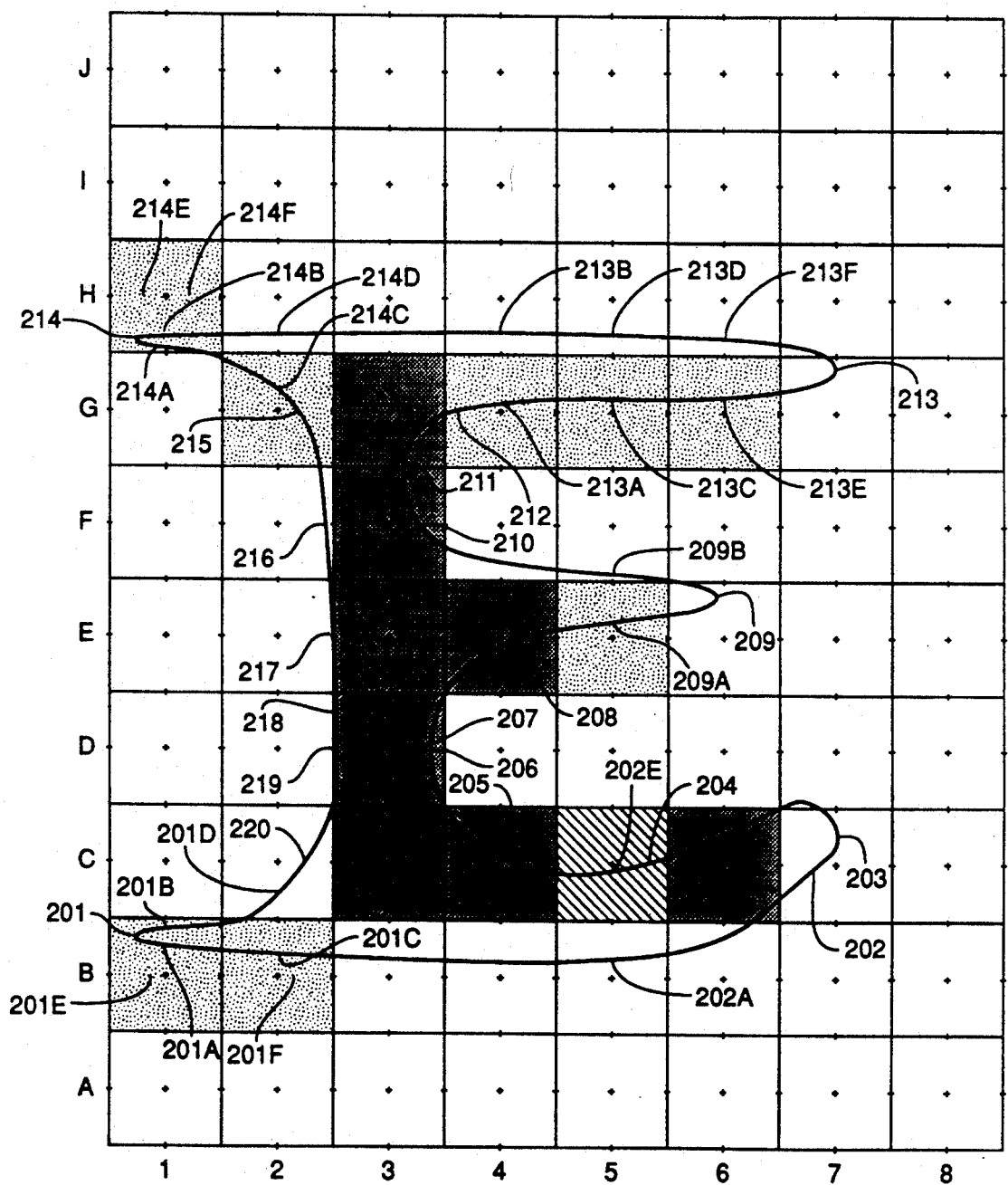
FIG. 9 illustrates a fanciful "E" character on a pixel grid to show details of detecting and fixing dropouts in X extremes. Stippling represents pixels filled according to the X extreme repair method.

FIG. 9 illustrates a fanciful "E" character having several narrow horizontal features. Using the center point fill method, pixels C3-G3 were filled, plus E4, C4 and C5. There were no narrow vertical excursions that would cause other pixels to be displayed according to the horizontal proximity fill test. Using the connected run dropout fill method as described above, the run displaying cross pair 220-205 was extended to include pixel C5. There were, however, a number of extremes on narrow horizontal features which were not displayed by runs. This resulted in the character being inaccurately displayed. Points 201, 203, 207, 209, 211, 213, 214 and 218 in FIG. 9 were all examples of extremes. Several were less than one-half pixel from the closest adjacent cross pair and were therefore ignored. For example, extreme 203 was close to 204-202, displayed by run C6—C6 (or C5-C6, depending on which run pixel C5 is assigned to) and was therefore ignored. Similarly, extremes 207, 211 and 218 were ignored.

Some extremes required further analysis to properly display appropriate runs. For example, starting in scan line B the path through extreme 201 was traced backwards to cross 220, which was paired with cross 205 (displayed by run C3-C5). The path through extreme 201 was also traced forward to adjacent cross pair 202-204 (displayed by run C6—C6). Extreme 201 was to the left of both runs and closer to the run displaying cross pair 220-205. Tracing the path backward from extreme 201 to cross 220 identified intersections 201B and 201D with vertical midlines between the closest run and the extreme. Tracing the path forward from extreme 201 to cross 202 identified intersections 201A and 201C with vertical midlines between the closest run and the extreme. In column 1, intersections 201A and 201B were ordered from bottom to top, the midpoint was calculated to lie in pixel B1. In column 2, intersections 201C and 201D were ordered and the midpoint was calculated to lie in pixel B2. The new pixels to be displayed did not extend a run so pseudocrosses 201E and 201F were created and placed in scan line order at the beginning of scan line B to properly display extreme 201.

Extreme 209 was more than one-half pixel from the closest adjacent run, with one intervening vertical midline in column 5. Tracing the path backwards and forwards from 209 identified intersections 209A and 209B which are ordered from bottom to top, the midpoint was calculated and run E3-E4 was extended to include pixel E5.

Extremes 213 and 214 were each more than one-half pixel from the closest displayed pixel. Extreme 214 was separated from G3 by vertical midlines in both columns 1 and 2. Tracing the path forward from 214 identified intersections 214A and 214C and tracing the path backward through extreme 213 to cross 212 identified intersections 214B and 214D. The crosses 214A-214B and 214C 214D were ordered vertically, the midpoints were calculated, run G3—G3 was extended to include pixel G2, and pseudocrosses 214E and 214F were created to display new run H1—H1. In a similar manner, tracing forward and backward from 213 identified intersections 213A through 213F which were ordered vertically in each column and run G2-G3 (cross pair 215-212) was extended to display these pixels.

One advantage of the method of the present invention for correcting dropouts is that it uses the minimum number of pixels to connect disconnected runs, while still following the path of the character outline.

One skilled in the art will recognize and be above to practice additional variations on the methods described herein which fall within the teachings and claims of this invention.

What is claimed is:

1. In a method of displaying a character on a raster device using a modified center point fill method, defining said character by an outline defining the boundary of said character, where said outline is composed of a series of edges in a path, and scaling the character to pixel grid of columns and scan lines to obtain a set of pixels for display, the improvement comprising
    identifying as a cross each point where an edge of said character intersects a horizontal midline of a scan line,
    storing a list of pairs of said crosses as cross pairs,
    for each cross pair, identifying pixels of said set of pixels having centers between the crosses of said cross pair and storing the range of said pixels as a pixel run for said cross pair,
    for each cross pair between two adjacent pixel centers, finding the horizontal midpoint of the cross pair and storing the pixel containing said horizontal midpoint as part of a pixel run for said cross pair,
    for each pair, identifying adjacent cross pairs in the order they occur in the path of the outline of said character and determining if each such identified cross pair is connected to adjacent cross pairs,
    if said cross pair is not so connected, then selecting at least one addition pixel to extend an existing pixel run toe connect such identified adjacent cross pairs, and
    displaying the character on said pixel grid, including said set of pixels and the selected additional pixels, substantially free of dropouts.

2. The method of claim 1 further comprising creating one or more pseudocross pairs as needed to connect adjacent cross pairs if said pixel runs for a first and a second adjacent cross pair are not connected.

3. The method of claim 1 wherein said adjacent cross pairs in path order are identified by
    tracing said path through a first one of said crosses of said cross pair forward in a first direction to a first adjacent cross in path order and finding a first adjacent cross pair including said first adjacent cross,
    tracing said path through said first cross backward in a second direction to a second adjacent cross in path order and finding a second adjacent cross pair including said second adjacent cross,
    tracing said path through the second one of said crosses of said cross pair forward to a third adjacent cross in path order and finding a third adjacent cross pair including said third adjacent cross, and
    tracing said path through said second cross backward to a fourth adjacent cross in path order and finding a fourth adjacent cross pair including said fourth adjacent cross.

4. The method of claim 1 wherein two said identified adjacent cross pairs are tested for proper connection by determining, where the pixel run for each said cross pair includes a leftmost pixel and a rightmost pixel, whether
    a) the leftmost pixel of a first of said pixel runs is more than one pixel to the right of the rightmost pixel of a second of said pixel runs or
    b) the rightmost pixel of said first pixel run is more than one pixel to the left of the leftmost pixel of said second pixel run, and
    if neither condition is true, then the pixel runs are properly connected but
    if either condition is true and said pixel runs are on adjacent scan lines, then said pixel runs are not properly connected,
    or if either condition is true and said pixel runs are on the same scan line and not directly connected but are otherwise connected by a continuous black portion of said character on the scan line adjacent to said scan line in the direction of the path connecting said pixel runs, then said runs are properly connected.

5. The method of claim 4 wherein two of said adjacent cross pairs are tested for proper connection by determining whether said two pixel runs are on the same scan line and one or more additional pixel runs connect said pixel runs on a scan line adjacent to said pixel run in the direction of the path connecting said pixel runs.

6. The method of claim 1 or claim 2 wherein a pixel is selected to connect two adjacent cross pairs by
    a) selecting a first and a second adjacent scan line, where said first adjacent scan line includes a first pixel run for a first one of said adjacent cross pairs and, if said two adjacent cross pairs are on different scan lines, where said second scan line includes a second pixel run containing the second adjacent cross pair, or, if said adjacent cross pairs are on the same scan line, said second adjacent scan line is up or down according to the direction of the path between said pixel runs,
    b) identifying each column that is between said first and second pixel runs, c) identifying all crosses in said first and second adjacent scan lines and tracing each path segment between said crosses, d) identifying all vertical intersections between any one of said path segments and a vertical midline through any of said columns between said pixel runs, and e) selecting a pixel from each one of said columns where said pixel is between said pixel runs and contains the midpoint in said column between a highest one of said vertical intersections on a lowest one of said path segments and a lowest one of said vertical intersection on a highest one of said path segments.

7. The method of claim 6 wherein a selected pixel is added to an existing pixel run, if possible, by identifying each existing pixel run, if any, which is horizontally adjacent to said pixel on the same scan line and extending at least one said horizontally adjacent pixel run to include said pixel, but if no existing pixel run is horizontally adjacent to said pixel, then creating a pseudocross pair on the horizontal midline through said pixel such that said pseudocross pair does not overlap an existing cross pair and storing said pixel as a pixel run for said pseudocross pair.

8. The method of claim 1 wherein certain features of said character are displayed by identifying X extremes where the local X-coordinate along said path is a maximum or minimum, and for each one of said X extremes, tracing said path forward in a first direction and backward in a second direction through said X extreme, finding the closest run on said path, testing said X extreme to see if it is connected to said closest pixel run and if not then extending an existing pixel run or creating at least one pseudocross pair and corresponding pixel run as needed to properly connect said X extreme to said closest pixel run.

9. The method of claim 8 wherein one of said X extremes is tested for proper connection to said closest pixel run by tracing said path forward from said X extreme to a closest forward cross and tracing said path backward from said X extreme to a closest backward cross, finding the forward pixel run for the cross pair including said closest forward cross and finding the backward pixel run for the cross pair including said closest backward cross, selecting between said forward pixel run and said backward pixel run the closest pixel run to said X extreme and determining whether said X extreme is less than one-half pixel distant from said closest pixel run and therefore is properly connected to said closest pixel run.

10. The method of claim 9 wherein a pixel is selected to connect X extremes to said closest pixel run, if needed, by tracing the path between said X extreme and said forward pixel run and also tracing the path between said X extreme and said backward pixel run, identifying all vertical intersections between either of said paths and each vertical midline between said X extreme and said closest pixel run, for each one of said vertical midlines between said X extreme and said closest pixel run, selecting a pixel which contains the midpoint along said vertical midline between a highest one of said vertical intersections on a lowest one of said forward or backward paths and a lowest one of said vertical intersections on a highest one of said forward or backward paths.

11. The method of claim 10 wherein said selected pixel is added to an existing pixel run if possible by identifying each existing pixel run, if any, which is horizontally adjacent to said pixel on the same scan line and extending at least one said horizontally adjacent pixel run to include said pixel, but if no existing pixel run is horizontally adjacent to said pixel, then creating a pseudocross pair on the horizontal midline through said pixel such that said pseudocross pair does not overlap an existing cross pair and storing said pixel as a pixel run for said pseudocross pair.

* * * * *

UNITED STATES PATENT AND TRADEMARK OFFICE
CERTIFICATE OF CORRECTION

PATENT NO.  : 5,233,336
DATED       : August 3, 1993
INVENTOR(S) : Byron, et al

It is certified that error appears in the above-indentified patent and that said Letters Patent is hereby corrected as shown below:

| | | |
|---|---|---|
| Col. 05, line 05 | delete "Programminc" | insert --Programming-- |
| Col. 12, line 25 | delete the second "." | |
| Col. 13, line 63 | delete "addition" | insert --additional-- |
| Col. 13, line 64 | delete "toe" | insert --to-- |

Signed and Sealed this

Eighteenth Day of October, 1994

Attest:

BRUCE LEHMAN

Attesting Officer

Commissioner of Patents and Trademarks